(12) United States Patent
Nentwig

(10) Patent No.: US 8,848,581 B2
(45) Date of Patent: Sep. 30, 2014

(54) UNSYNCHRONIZED SIGNALING IN RADIO SYSTEMS USING FREQUENCY DOMAIN PROCESSING

(75) Inventor: Markus Nentwig, Helsinki (FI)

(73) Assignee: Nokia Corporation, Espoo (FI)

( * ) Notice: Subject to any disclaimer, the term of this patent is extended or adjusted under 35 U.S.C. 154(b) by 498 days.

(21) Appl. No.: 13/001,499

(22) PCT Filed: Jun. 29, 2009

(86) PCT No.: PCT/IB2009/006086
§ 371 (c)(1),
(2), (4) Date: Apr. 20, 2011

(87) PCT Pub. No.: WO2009/156846
PCT Pub. Date: Dec. 30, 2009

(65) Prior Publication Data
US 2011/0274016 A1 Nov. 10, 2011

Related U.S. Application Data

(60) Provisional application No. 61/133,295, filed on Jun. 27, 2008.

(51) Int. Cl.
*H04J 1/00* (2006.01)
*H04L 27/26* (2006.01)
*H04L 5/00* (2006.01)

(52) U.S. Cl.
CPC ........... *H04L 5/0044* (2013.01); *H04L 27/2607* (2013.01); *H04L 5/0007* (2013.01); *H04L 27/2662* (2013.01)
USPC ............................ 370/281; 370/329; 370/344

(58) Field of Classification Search
None
See application file for complete search history.

(56) References Cited

U.S. PATENT DOCUMENTS 7,826,343 B2 * 11/2010 Krasner ......................... 370/208
7,990,841 B2 * 8/2011 Walton et al. ................. 370/208
(Continued)

FOREIGN PATENT DOCUMENTS

| CN | 1890938 A | 1/2007 |
|---|---|---|
| EP | 1542418 A1 | 6/2005 |
| EP | 1734711 A | 12/2006 |

OTHER PUBLICATIONS

International Search Report and Written Opinion of the International Searching Authority for PCT Application No. PCT/IB2009/006086, dated Sep. 25, 2009, 17 pages.

(Continued)

*Primary Examiner* — Willie J Daniel, Jr.
(74) *Attorney, Agent, or Firm* — Squire Patton Boggs (US) LLP

(57) ABSTRACT

A method for unsynchronized signaling between nodes in a network is described. The method includes partitioning a message for asynchronous transmission in a network into a plurality of symbols. A symbol includes a cyclic prefix. Causing the plurality of symbols to be transmitted (for example, via a transmitter) on one or more subcarriers allocated for asynchronous transmissions is also included in the method. A given symbol is transmitted so as to reduce a discontinuity between a previous symbol and the given symbol. The method may also include applying a phase shift to one or more symbols of the plurality of symbols. Transmitting may include transmitting at a transmission frequency, where a length of a transmission cycle is determined by the transmission frequency, and where a length of the cyclic prefix is equal to an integer number of transmission cycles. Apparatus and computer readable media are also described.

13 Claims, 11 Drawing Sheets

(56) References Cited

U.S. PATENT DOCUMENTS

| | | | |
|---|---|---|---|
| 8,054,901 B2* | 11/2011 | Yonge et al. .................. | 375/260 |
| 2007/0002725 A1 | 1/2007 | Nystrom et al. | |
| 2011/0096703 A1 | 4/2011 | Nentwig et al. | |

OTHER PUBLICATIONS

Haas et al., "Dual Busy Tone Multiple Access (DBTMA)—A Multiple Access Control Scheme for Ad Hoc Networks", IEEE Transactions on Communications, vol. 50, No. 6, Jun. 2002.

Vijay Venkateswaran et al., "Source Separation of Asynchronous OFDM Signals using Superimposed Training", 2007 IEEE International Conference on Acoustics, Speech and Signal Processing, Apr. 16-20, 2007; Honolulu, HI, vol. 1 of 12, IEEE Catalog No. 07CH37846, ISBN: 1-4244-0727-3.

Chinese Office Action; dated Dec. 24, 2012; Issued on corresponding Chinese Application No. 200980124720.6.

Third Office Action dated Mar. 7, 2014 corresponding to Chinese Patent Application No. 200980124720.6 and English translation thereof.

\* cited by examiner

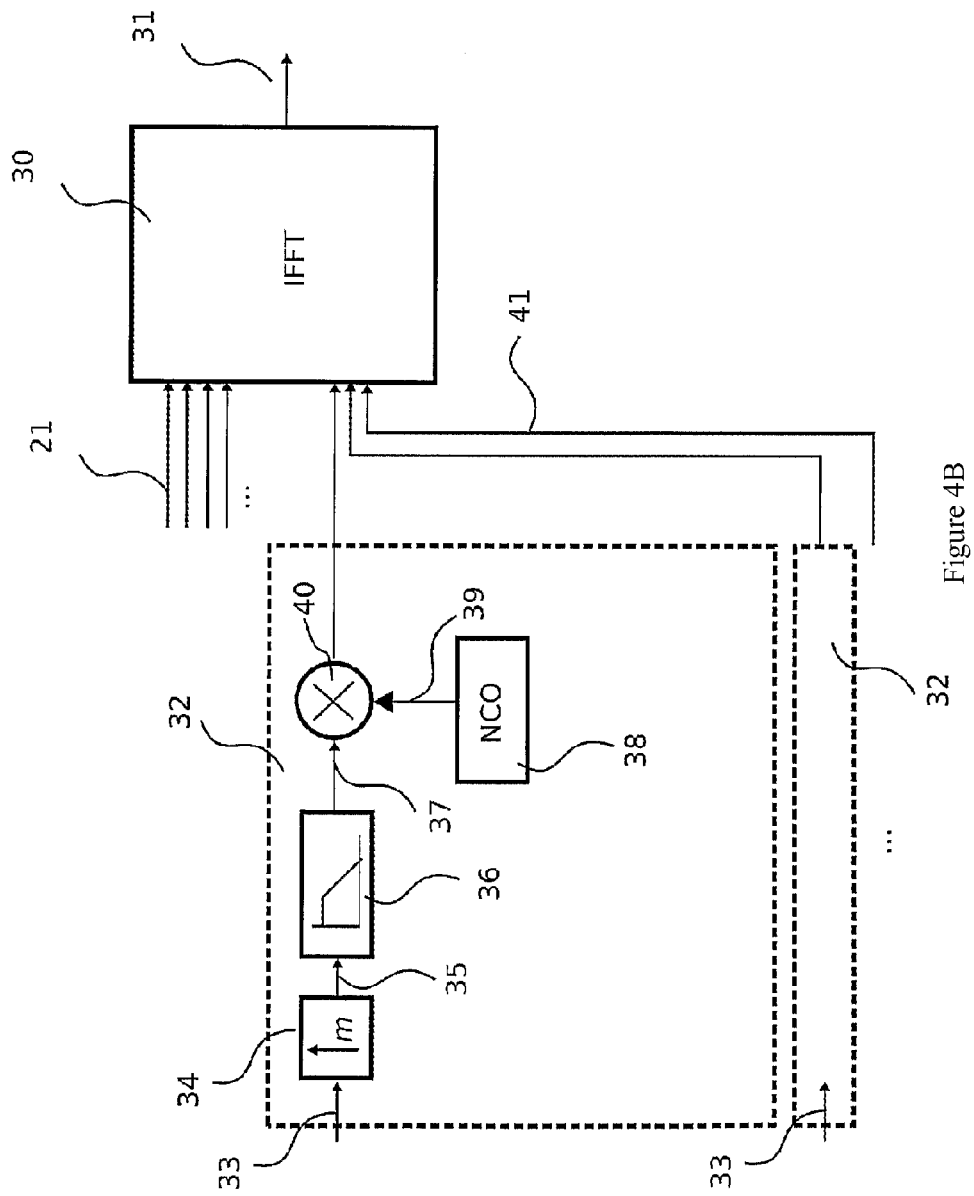

UNSYNCHRONIZED SIGNALING IN RADIO SYSTEMS USING FREQUENCY DOMAIN PROCESSING

RELATED APPLICATION

This application was originally filed as PCT Application No. PCT/IB2009/006086 filed on Jun. 29, 2009 and claims priority to U.S. Provisional Application No. 61/133,295 filed on Jun. 27, 2008, which is incorporated herein by reference in its entirety.

TECHNICAL FIELD

The exemplary and non-limiting embodiments of this invention relate generally to wireless communication systems, methods, devices and computer programs and, more specifically, relate to unsynchronized signaling between nodes in a frequency domain-type system, and to reduction of leakage into unsynchronized receivers.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:

| | |
|---|---|
| 3GPP | third generation partnership project |
| ASC | subcarrier used for asynchronous signaling |
| CDM | code division multiplexing |
| CP | cyclic prefix |
| DL | downlink (eNB towards UE) |
| eNB | E-UTRAN Node B (evolved Node B) |
| EPC | evolved packet core |
| E-UTRAN | evolved UTRAN (LTE) |
| FFT | fast Fourier transform |
| FIR | finite impulse response |
| FSU | flexible spectrum use |
| HARQ | hybrid automatic repeat request |
| I/Q | inphase/quadrature |
| ICI | intercarrier interference |
| IFFT | inverse fast Fourier transform |
| ISI | intersymbol interference |
| LTE | long term evolution of 3GPP |
| MAC | medium access control (layer 2, L2) |
| MIMO | multiple input multiple output |
| MM/MME | mobility management/mobility management entity |
| NCO | numerically controlled oscillator |
| Node B | base station |
| O&M | operations and maintenance |
| OFDM | orthogonal frequency division multiplex |
| OFDMA | orthogonal frequency division multiple access |
| PDCP | packet data convergence protocol |
| PHY | physical (layer 1, L1) |
| RB | resource block |
| RLC | radio link control |
| RRC | radio resource control |
| RRM | radio resource management |
| S-GW | serving gateway |
| SC | subcarrier |
| SC-FDMA | single carrier, frequency division multiple access |
| SNR | signal to noise ratio |
| UE | user equipment, such as a mobile station or mobile terminal |
| UL | uplink (UE towards eNB) |
| UTRAN | universal terrestrial radio access network |

The International Telecommunications Union (ITU) is specifying system requirements for next generation mobile communication systems, referred to at present as International Mobile Telecommunications-Advanced (IMT-A). Current 3 G mobile communication systems, including their evolutions, are in this respect part of the ITU IMT-2000 system. IMT-A systems are expected to provide peak data rates in the order of 1 Gbit/s in local areas (LAs). To support these data rates advanced MIMO antenna technology will be used in order to achieve high spectral efficiency. In addition, a high system bandwidth allocation, in the range of about 100 MHz, is expected to be used.

Even though new frequency bands are expected to be allocated for use by IMT-A, the high system bandwidth requirements will require that different system operators share the available spectrum. This presents a radically different approach to that used currently in IMT-2000 systems (e.g., GSM/UMTS), where each network operator operates its associated network in a dedicated licensed band. The spectrum sharing may be referred to generally as FSU.

One challenge in the use of FSU is determining at a particular device A whether a given spectrum resource may be safely used without interfering with the reception of device B. More specifically, even though device A cannot directly sense a transmission that device B receives, it will cause undue interference in the reception of that transmission if it uses the same portion of the spectrum resource for its own transmission.

A number of state-of-the-art communication systems use frequency domain processing. In such a system, the total transmit bandwidth is divided into a number of subcarriers, separated by frequency intervals that are proportional to the inverse of the symbol length. The spectrum of each individual subcarrier contains spectral nulls at the frequencies of all other subcarriers, allowing a low-complexity implementation of both the receiver and transmitter. The addition of a cyclic prefix (CP) allows the receiver to process one symbol at a time, even though the timing between transmitter and receiver may be known only with limited accuracy and is possibly blurred by multipath reflections. Since OFDM is a well-known system using frequency-domain processing, such radio systems that use frequency domain processing will be referred to herein for convenience, and not as a limitation, as "OFDM-like systems". SC-FDMA is an example of another "OFDM-like" system. Typically, frequency domain processing is implemented in receivers and transmitters using FFT and IFFT to convert signal representations between the time domain and the frequency domain.

In OFDM-like systems a possible approach is to enable signaling between nearby nodes by allocating subcarriers for signaling between unsynchronized devices. Such subcarriers will be referred to as ASCs ("asynchronous subcarriers"). A radio system may use any number of ASCs for FSU coordination and for other purposes. For example, a radio system may group 12 subcarriers into one resource block (RB), and allocate one ASC per resource block. The resulting spacing of 180 kHz between ASCs provides robustness against frequency selective fading.

If devices are synchronized, a message broadcast on ASCs would not interfere with reception of other devices on nearby subcarriers. However, when the transmitter and receiver are unsynchronized one consequence may be the generation of intercarrier interference (ICI) into nearby subcarriers, thereby deteriorating reception.

In a publication "Dual Busy Tone Multiple Access (DBTMA) B A Multiple Access Control Scheme for Ad Hoc Networks", Z. Haas et al., IEEE Transactions on Communications, Vol. 50, No. 6, June 2002, there is described a coordination mechanism that uses narrow-bandwidth, out-of-band tones.

The concept of adding "training"/"pilot" signals specifically for asynchronous OFDM reception is generally known, as indicated by a publication "Source separation of asynchronous OFDM signals using superimposed training", V. Venkateswaran et al., ICASSP 2007. This publication proposes to provide a "superimposed training sequence". However, the sequence appears to be padded with a CP.

The technical specification 3 GPP TS 36.211 V8.3.0 (2008-05), 3rd Generation Partnership Project; Technical Specification Group Radio Access Network; Evolved Universal Terrestrial Radio Access (E-UTRA); Physical Channels and Modulation (Release 8) describes the physical channel and modulation processing requirements in radio transmitters and receivers according to E-UTRA (evolved UTRA, also known as LTE (long term evolution)).

SUMMARY

The below summary section is intended to be merely exemplary and non-limiting.

The foregoing and other problems are overcome, and other advantages are realized, by the use of exemplary embodiments of this invention.

In a first aspect thereof exemplary embodiments of this invention provide a method for unsynchronized signaling between nodes in a network (e.g., eNB, UE, access nodes, etc.). The method includes partitioning a message for asynchronous transmission in a network into a plurality of symbols. A symbol includes a cyclic prefix. Causing the plurality of symbols to be transmitted (for example, via a transmitter) on one or more subcarriers allocated for asynchronous transmissions is also included in the method. A given symbol is transmitted so as to reduce a discontinuity between a previous symbol and the given symbol.

In a further aspect thereof exemplary embodiments of this invention provide an apparatus for unsynchronized signaling between nodes in a network. The apparatus includes one or more processors; and one or more memories including computer program code. The one or more memories and the computer program code configured to, with the one or more processors, at least cause the apparatus: to partition a message for asynchronous transmission in a network into a plurality of symbols, where a symbol comprises a cyclic prefix; and to cause the plurality of symbols to be transmitted, via a transmitter, on at least one subcarrier allocated for asynchronous transmissions, where a given symbol is transmitted so as to reduce a discontinuity between a previous symbol and the given symbol.

In an additional aspect thereof exemplary embodiments of this invention provide a computer readable medium for unsynchronized signaling between nodes in a network. The computer readable medium is tangibly encoded with a computer program executable by a processor to perform actions. The actions include partitioning a message for asynchronous transmission in a network into a plurality of symbols. A symbol includes a cyclic prefix. Causing the plurality of symbols to be transmitted (for example, via a transmitter) on one or more subcarriers allocated for asynchronous transmissions is also included in the actions. A given symbol is transmitted so as to reduce a discontinuity between a previous symbol and the given symbol.

In a further aspect thereof exemplary embodiments of this invention provide an apparatus for unsynchronized signaling between nodes in a network. The apparatus includes means for partitioning a message for asynchronous transmission in a network into a plurality of symbols. A symbol includes a cyclic prefix. Means for transmitting the plurality of symbols on one or more subcarriers allocated for asynchronous transmissions is also included in the apparatus. A given symbol is transmitted so as to reduce a discontinuity between a previous symbol and the given symbol.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIGS. 4A, 4B and 4C, collectively referred to as FIG. 4, illustrate non-limiting examples of functional blocks that can be used to implement an aspect of the invention, where FIG. 4A reproduces FIG. 6.3.1 of 3 GPP TS 36.211, V 8.3.0, and shows an overview of physical channel processing in a transmitter generating downlink signals conforming with E-UTRA requirements;

FIG. 4B shows an exemplary embodiment of the invention that forms at least part of the OFDM signal generation block depicted in FIG. 4A; and FIG. 4C shows part of an OFDM receiver implementing an embodiment of the invention.

DETAILED DESCRIPTION

Figure 7:
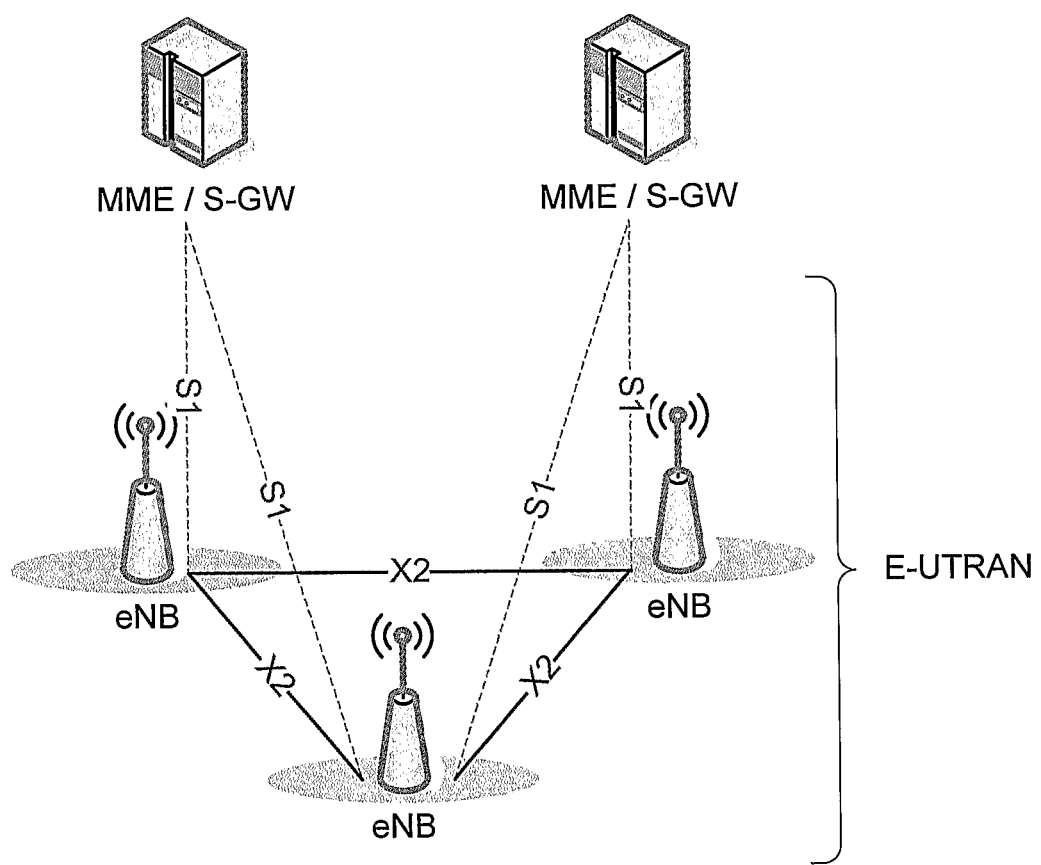
FIG. 7 reproduces FIG. 4 of 3 GPP TS 36.300, and shows the overall architecture of the E UTRAN system.
Figure 8:
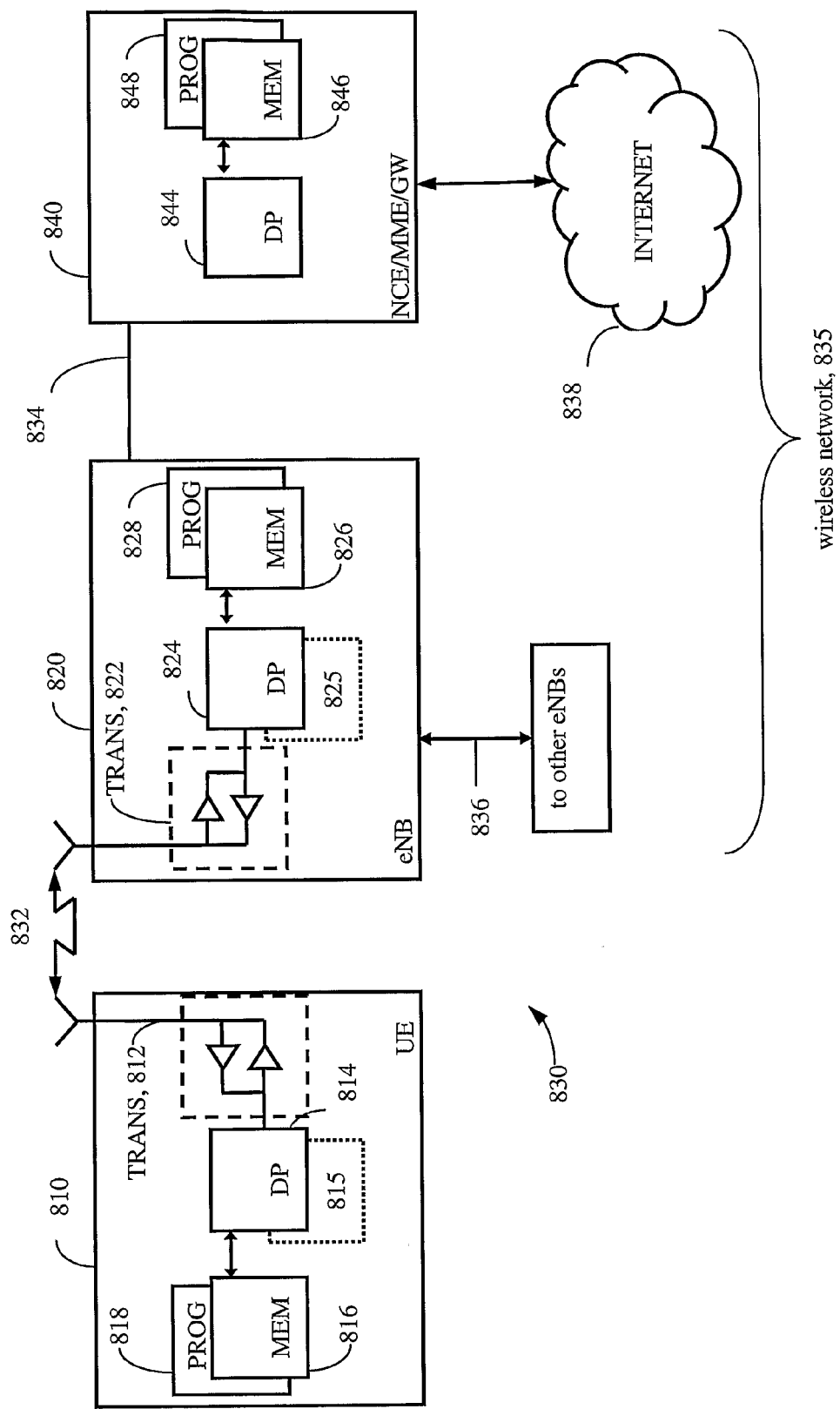
FIG. 8 shows a simplified block diagram of various exemplary electronic devices that are suitable for use in practicing exemplary embodiments of this invention.
Figure 9:
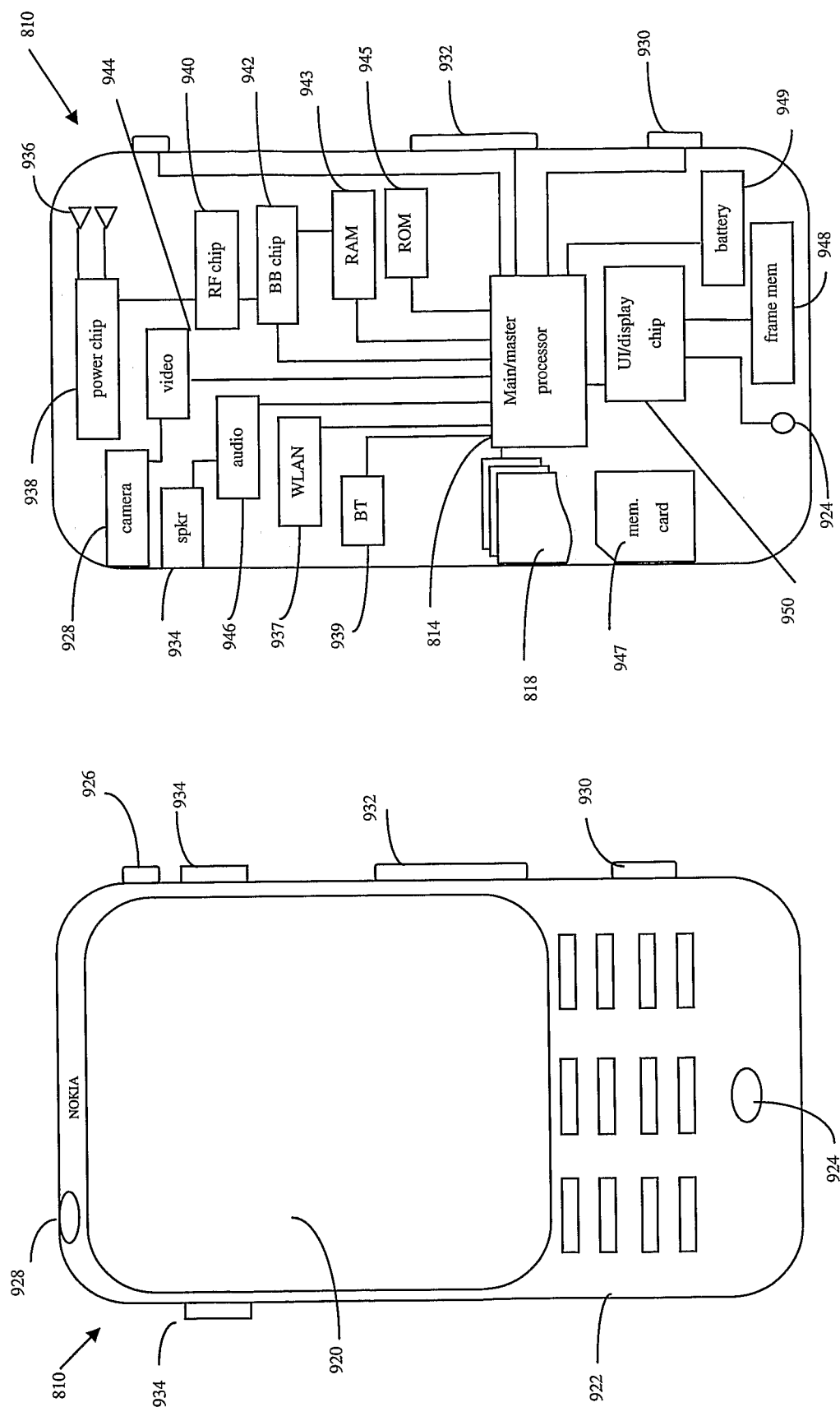
FIG. 9 shows a more particularized block diagram of an exemplary user equipment such as that shown at FIG. 8.

Before describing in further detail exemplary embodiments of this invention, reference is made to FIGS. 7-9 for illustrating simplified block diagrams of various electronic devices and apparatus that are suitable for use in practicing exemplary embodiments of this invention.

FIG. 7 reproduces FIG. 4.1 of 3 GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:

functions for RRM: Radio Bearer Control, Radio Admission Control, Connection Mobility Control, Dynamic allocation of resources to UEs in both UL and DL (scheduling);

IP header compression and encryption of the user data stream;

selection of a MME at UE attachment;

routing of User Plane data towards the Serving Gateway;

scheduling and transmission of paging messages (originated from the MME);

scheduling and transmission of broadcast information (originated from the MME or O&M); and a measurement and measurement reporting configuration for mobility and scheduling.

In the wireless system 830 of FIG. 8, a wireless network 835 is adapted for communication over a wireless link 832 with an apparatus, such as a mobile communication device which may be referred to as a UE 810, via a network access node, such as a Node B (base station), and more specifically an eNB 820. The network 835 may include a network control element (NCE) 840 that may include the MME/S GW functionality shown in FIG. 7, and which provides connectivity with a network, such as a telephone network and/or a data communications network (e.g., the internet 838).

The UE 810 includes a controller, such as a computer or a data processor (DP) 814, a computer-readable memory medium embodied as a memory (MEM) 816 that stores a program of computer instructions (PROG) 818, and a suitable radio frequency (RF) transceiver 812 for bidirectional wireless communications with the eNB 820 via one or more antennas.

The eNB 820 also includes a controller, such as a computer or a data processor (DP) 824, a computer-readable memory medium embodied as a memory (MEM) 826 that stores a program of computer instructions (PROG) 828, and a suitable RF transceiver 822 for communication with the UE 810 via one or more antennas. The eNB 820 is coupled via a data/control path 834 to the NCE 840. The path 834 may be implemented as the S1 interface shown in FIG. 7. The eNB 820 may also be coupled to another eNB via data/control path 836, which may be implemented as the X2 interface shown in FIG. 7.

The NCE 840 includes a controller, such as a computer or a data processor (DP) 844, a computer-readable memory medium embodied as a memory (MEM) 846 that stores a program of computer instructions (PROG) 848.

At least one of the PROGs 818, 828 and 848 is assumed to include program instructions that, when executed by the associated DP, enable the device to operate in accordance with exemplary embodiments of this invention, as will be discussed below in greater detail.

That is, exemplary embodiments of this invention may be implemented at least in part by computer software executable by the DP 814 of the UE 810; by the DP 824 of the eNB 820; and/or by the DP 844 of the NCE 840, or by hardware, or by a combination of software and hardware (and firmware).

The UE 810 and the eNB 820 may also include dedicated processors, for example signaling synchronizer 815 and signaling synchronizer 825.

In general, the various embodiments of the UE 810 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 816, 826 and 846 may be of any type suitable to the local technical environment and may be implemented using any suitable data storage technology, such as semiconductor based memory devices, flash memory, magnetic memory devices and systems, optical memory devices and systems, fixed memory and removable memory. The DPs 814, 824 and 844 may be of any type suitable to the local technical environment, and may include one or more of general purpose computers, special purpose computers, microprocessors, digital signal processors (DSPs) and processors based on a multicore processor architecture, as non-limiting examples.

FIG. 9 illustrates further detail of an exemplary UE in both plan view (left) and sectional view (right), and the invention may be embodied in one or some combination of those more function-specific components. At FIG. 9 the UE 810 has a graphical display interface 920 and a user interface 922 illustrated as a keypad but understood as also encompassing touch-screen technology at the graphical display interface 920 and voice-recognition technology received at the microphone 924. A power actuator 926 controls the device being turned on and off by the user. The exemplary UE 810 may have a camera 928 which is shown as being forward facing (e.g., for video calls) but may alternatively or additionally be rearward facing (e.g., for capturing images and video for local storage). The camera 928 is controlled by a shutter actuator 930 and optionally by a zoom actuator 932 which may alternatively function as a volume adjustment for the speaker(s) 934 when the camera 928 is not in an active mode.

Within the sectional view of FIG. 9 are seen multiple transmit/receive antennas 936 that are typically used for cellular communication. The antennas 936 may be multi-band for use with other radios in the UE. The operable ground plane for the antennas 936 is shown by shading as spanning the entire space enclosed by the UE housing though in some embodiments the ground plane may be limited to a smaller area, such as disposed on a printed wiring board on which the power chip 938 is formed. The power chip 938 controls power amplification on the channels being transmitted and/or across the antennas that transmit simultaneously where spatial diversity is used, and amplifies the received signals. The power chip 938 outputs the amplified received signal to the radio-frequency (RF) chip 940 which demodulates and downconverts the signal for baseband processing. The baseband (BB) chip 942 detects the signal which is then converted to a bit-stream and finally decoded. Similar processing occurs in reverse for signals generated in the apparatus 810 and transmitted from it.

Signals to and from the camera 928 pass through an image/video processor 944 which encodes and decodes the various image frames. A separate audio processor 946 may also be present controlling signals to and from the speakers 934 and the microphone 924. The graphical display interface 920 is refreshed from a frame memory 948 as controlled by a user interface chip 950 which may process signals to and from the display interface 920 and/or additionally process user inputs from the keypad 922 and elsewhere.

Certain embodiments of the UE 810 may also include one or more secondary radios such as a wireless local area network radio WLAN 937 and a Bluetooth® radio 939, which may incorporate an antenna on-chip or be coupled to an off-chip antenna. Throughout the apparatus are various memories such as random access memory RAM 943, read only memory ROM 945, and in some embodiments removable memory such as the illustrated memory card 947. The various programs 818 are stored in one or more of these memories. All of these components within the UE 810 are normally powered by a portable power supply such as a battery 949.

Processors 938, 940, 942, 944, 946, 950, if embodied as separate entities in a UE 810 or eNB 820, may operate in a slave relationship to the main processor 814, 824, which may then be in a master relationship to them. Embodiments of this invention are most relevant to the DP 814, BB chip 942, RF chip 940 and power chip 938, though it is noted that other embodiments need not be disposed there but may be disposed across various chips and memories as shown or disposed within another processor that combines some of the functions described above for FIG. 9. Any or all of these various processors of FIG. 9 access one or more of the various memories, which may be on-chip with the processor or separate therefrom. Similar function-specific components that are directed toward communications over a network broader than a piconet (e.g., components 936, 938, 940, 942-945 and 947) may also be disposed in exemplary embodiments of the access node 820, which may have an array of tower-mounted antennas rather than the two shown at FIG. 9.

Note that the various chips (e.g., 938, 940, 942, etc.) that were described above may be combined into a fewer number than described and, in a most compact case, may all be embodied physically within a single chip.

As was noted above, future radio systems are expected to implement FSU, which may be a requirement for new spectral bands in the 3 GHz range that are allocated to IMT-A. A challenge in FSU is that nodes continuously need to detect each other's presence, and are initially unsynchronized.

Figure 1A:
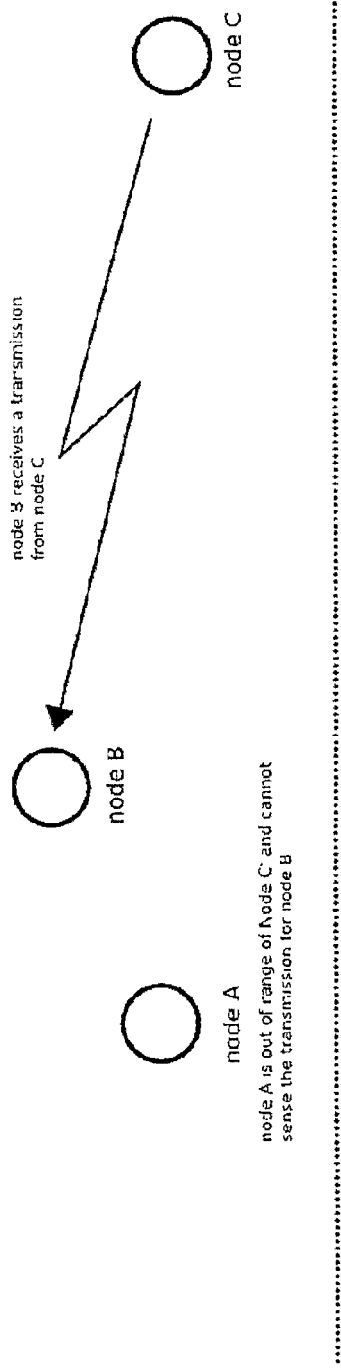
FIGS. 1A and 1B, collectively referred to as FIG. 1, illustrate a problem in FSU where spectrum sensing cannot detect the presence of a receiver, only a transmitter, and thus depicts the basis for the hidden node problem.
Figure 1B:
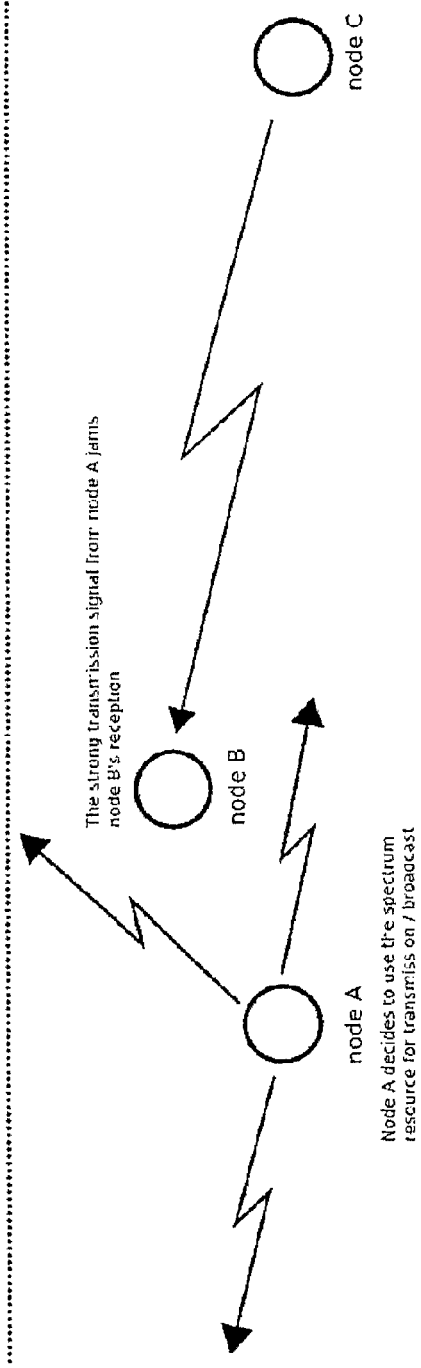

With regard to the hidden-node problem, in a FSU system a device A needs to determine whether a given spectrum resource may be safely used, without interfering with reception of device B in a different physical location. Even though device A cannot sense the transmission that device B receives, it will cause undue interference if it uses that spectrum resource for transmission. FIG. 1 illustrates this problem in the context of three devices (nodes A, B and C). Note in FIG. 1A that node A is out of range of the Node C and thus does not detect the transmission from node C to node B (node C is "hidden" from node A). In FIG. 1B, if node A decides to use the same spectrum that is used by node C, then the transmission from node A can severely degrade (jam) the reception of the node C transmission by node B.

The hidden-node problem is inherent to channel access schemes that sense the presence of a transmitter only. It can be overcome by using signaling protocols that allow nodes to communicate with nearby nodes, in order to prevent collisions of data messages. One example for such a signaling protocol is "busy tone signaling", as described in Haas.

Other examples for protocols including signaling to coordinate shared channel access are the MACAW protocol (e.g., see V. Bharghavan, A. Demers, S. Shenker, L. Zhang, "MACAW: a media access protocol for wireless LAN's", Proceedings of the conference on Communications architectures, protocols and applications, p. 212-225, Aug. 31-Sep. 2, 1994, London, United Kingdom), and the RTS/CTS-exchange in the IEEE 802.11 standard (WLAN) (e.g., see IEEE 802.11 WG, "Wireless LAN Medium Access Control (MAC) and Physical Layer (PHY) Specifications", IEEE 802.11 Standard, 1999).

A different approach is to negotiate the use of radio resources between adjacent nodes based on a set of common rules For example, it has been proposed to use a game-theoretic approach to radio resource sharing (e.g., see "Game Theory for Wireless Engineers (Synthesis Lectures on Communications)", Allen B. MacKenzie, Luiz A. DaSilva, Morgan & Claypool Publishers (2006) ISBN:1598290169). This approach often uses some means of communication between adjacent nodes.

While FSU has been presented as an example where a radio system benefits from the capability of signaling between adjacent nodes, there are other applications for a non-synchronous signaling scheme. For example, a radio system may allow each base station to choose timing parameters, such as symbol length or cyclic prefix length, according to the cell size. Non-synchronous signaling may be used to transmit beacon information, allowing a mobile device to receive beacons from two base stations even though they transmit using different parameters.

Figure 6:
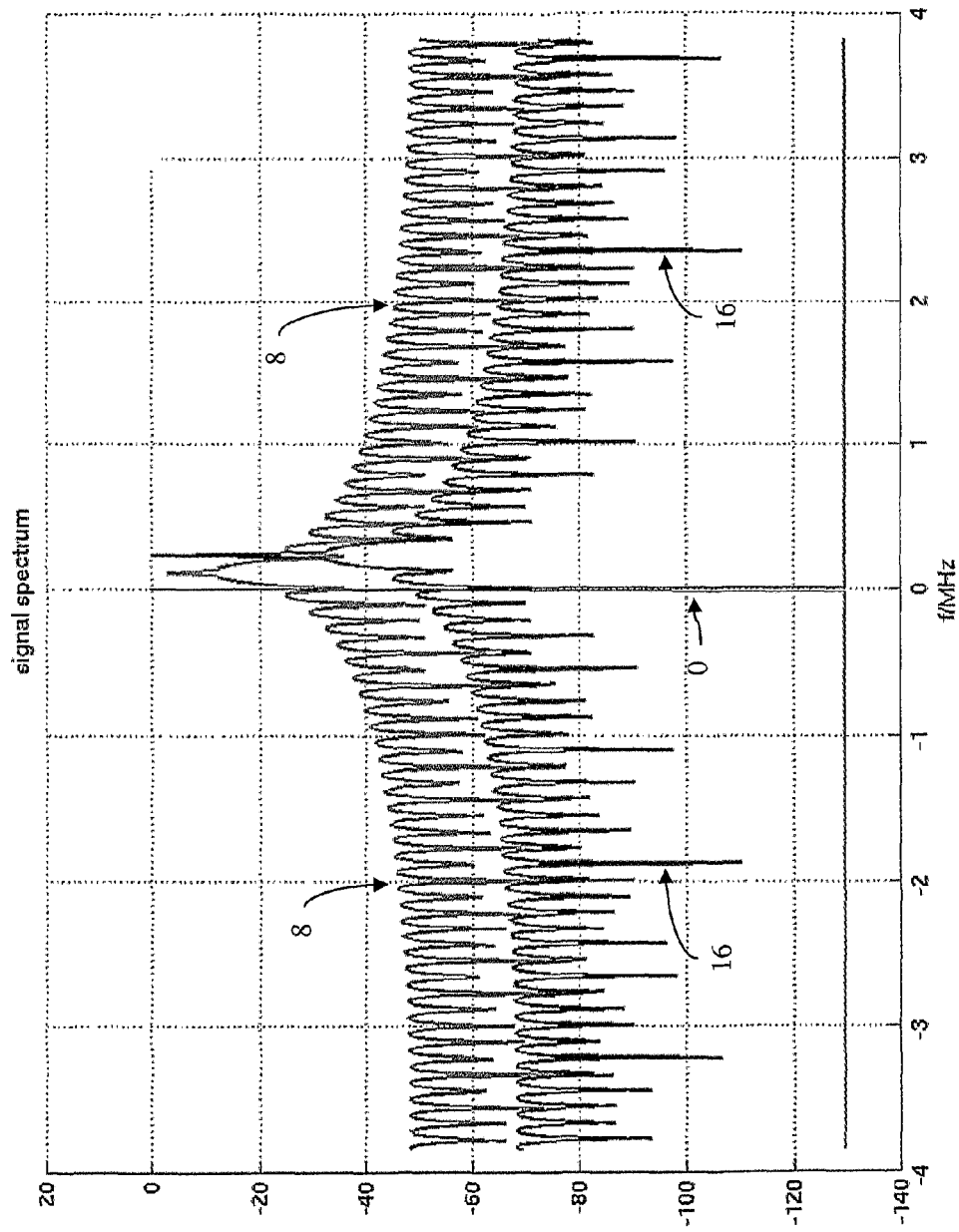
FIG. 6 is a graph showing unsynchronized ICI spectrum for worst case (subcarrier 8) and optimum (best case) subcarrier 16.

Discussed now is unsynchronized signaling in frequency domain communication systems. With regard to synchronized transmission, such systems use symbol synchronization within one CP length. If this synchronization is not satisfied, then ICI results, where energy from one subcarrier leaks into adjacent subcarriers. An exemplary spectrum for ICI is shown in FIG. 6.

OFDM-like systems use the CP, where the end of each symbol is repeated, e.g., prefixed, before its start. A synchronized receiver applies a time window to the received signal, and processes the signal within the window. For ICI-free reception, the timing window needs to be synchronized to the symbol stream with an accuracy of the CP length (or less).

Since a receiver processing a message on ASCs is not synchronized with their symbol timing, the length of signal processed at a time (corresponding to one FFT length in a typical receiver implementation) may, for example, include the end of symbol n, the cyclic prefix of the following symbol n+1, and the beginning of symbol n+1 on the ASCs.

A possible mechanism to implement asynchronous signaling is to transmit m weighted repetitions of the same value on each ASC. The receiver then selects one out of every m FFT intervals, and uses the output values of an FFT corresponding to subcarriers allocated for asynchronous signaling for further processing. In this approach, the time domain waveform of the ASC is continuous across the boundary between symbol n and the cyclic prefix of symbol n+1.

At any given time a subcarrier is used exclusively for either asynchronous signaling or for data transmission. The asynchronous signaling causes no interference to data reception as long as the time domain waveforms of the ASCs are continuous within the symbol length processed by the receiver. A discontinuity of two adjacent symbols on the ASCs will appear within the reception window of the data transmission, since the symbol timing of the ASCs is different from that of the data transmission on adjacent subcarriers, and will result in the generation of ICI.

Figure 2:
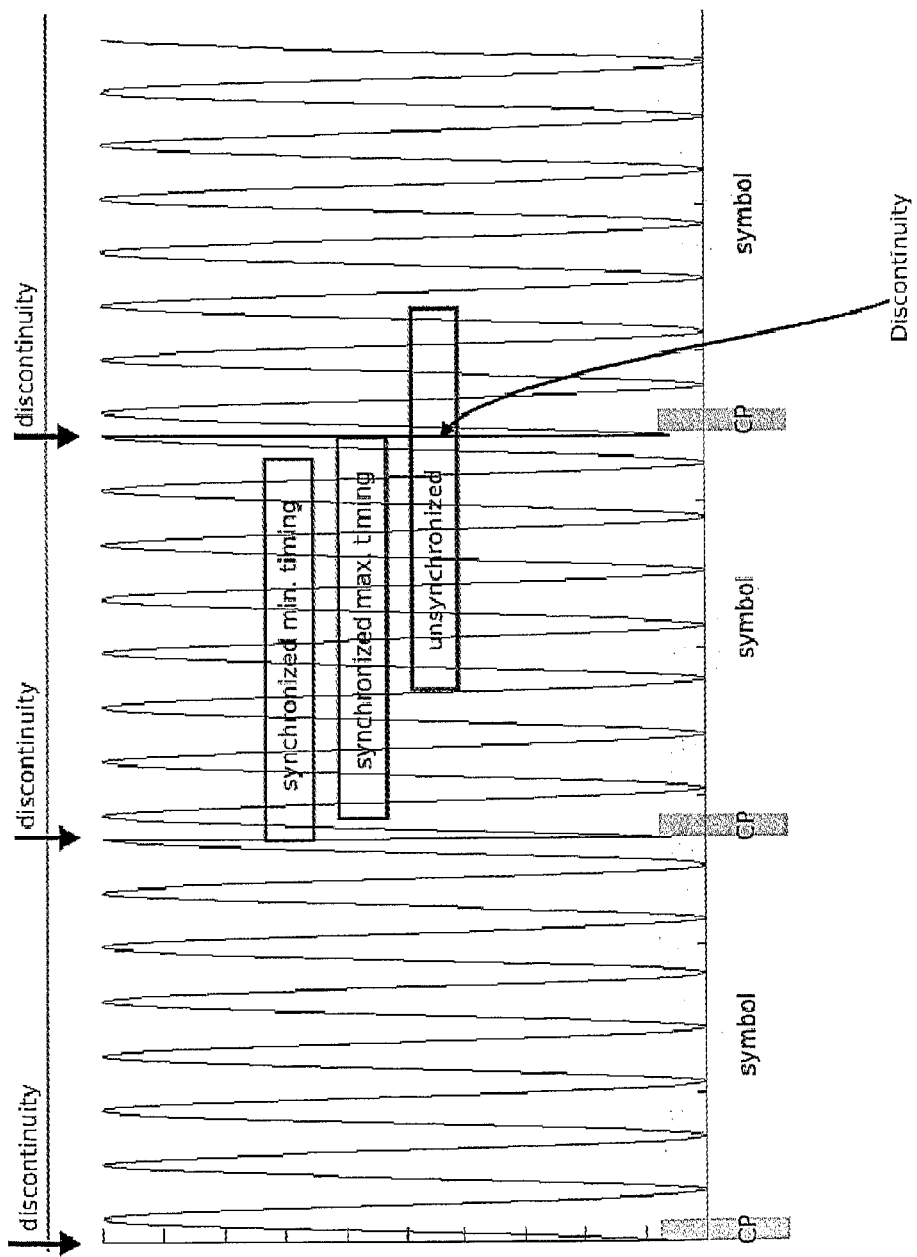
FIG. 2 shows how ISI results in an unsynchronized OFDM receiver that leads eventually to ICI, and contrasts this case with the use of early and late timing windows by a synchronized receiver that avoids ISI and the associated ICI.

FIG. 2 shows an example of how ISI results when the receiver is unsynchronized and leads to ICI. The waveform corresponds to the baseband signal of a one-subcarrier OFDM symbol, with an identical symbol repeated several times, weighted with a common factor. Within one symbol length, the subcarrier is cyclic, but the CP introduces a discontinuity at the border of the next symbol. For comparison, "Min. timing" and "Max. timing" show the two extreme early/late timing windows used by a synchronized receiver so as to avoid the discontinuity, and therefore avoid ICI. The third window shows an unsynchronized receiver. As can be seen, the discontinuity between two symbols falls into the reception interval and results in the receiver experiencing ICI.

In a first exemplary embodiment of this invention the ICI is reduced or eliminated, e.g., there is a reduction of the leakage to the unsynchronized receiver, by subcarrier selection.

The aforementioned CP-related discontinuity depends on the subcarrier number (that is, frequency). As will be explained below, some subcarriers are well suited for unsynchronized reception since they fit (approximately) an integer number of cycles within the CP length. Therefore, by selecting appropriate subcarriers for asynchronous signaling one can reduce the ICI experienced by an unsynchronized receiver.

This exemplary embodiment thus provides a radio system that uses frequency domain processing, where at least one selected subcarrier is allocated for unsynchronized communications. In this embodiment the at least one selected subcarrier is used for FSU signaling and is selected based on an amount of interference generated by the use of the subcarrier. Preferably a data rate of the unsynchronized signaling is a fraction of the synchronized symbol rate (that is, an FSU signaling symbol extends over the length of two or more data symbols). In this case the transmitter repeats each unsynchronized symbol over the length of several OFDM symbols, scaled using a predetermined sequence of weighting factors.

Further with regard to this embodiment, it is noted that a single subcarrier is a sine wave in the time domain, its number corresponding to the frequency. For every subcarrier, a full number of cycles are contained within the symbol, leading to orthogonality and ICI-free reception. ICI is generated due to the fact that, with the addition of the CP, the length of the symbol plus the CP is not a full number of cycles.

The amount of ICI created by any subcarrier depends on the energy in the discontinuity, which in turn depends on the number of periods of the subcarrier that fit into the CP length. However, for a subcarrier that fits an integer number of cycles within the CP length, there is no resultant ICI. For a subcarrier with a number of (n+½) number of cycles in one CP length the ICI is maximal. The amount of ICI created by a subcarrier is a sine function of the subcarrier number.

Figure 5:
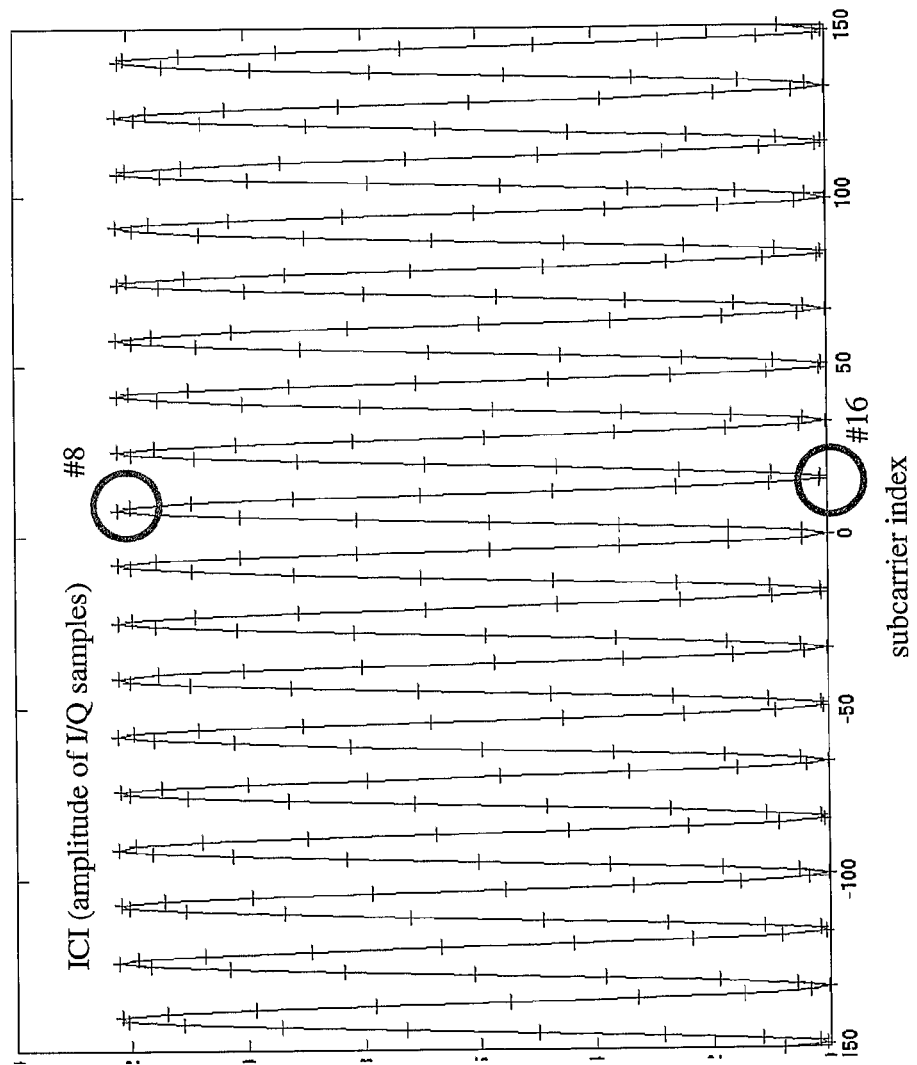
FIG. 5 is a graph that depicts a simulated ICI amplitude versus subcarrier index.

FIG. 5 shows a simulated ICI magnitude for an LTE system using 512 FFT bins, 301 subcarriers and a CP length of 31 samples at a 7.84 MHz sampling rate (I/Q). Each cross corresponds to one subcarrier number. The continuous line indicates the underlying sine curve, which can be understood as a beat frequency generated from the subcarrier frequency and the CP length. As can be seen, subcarriers 0, 16, 33, 50, 66, etc., are comparatively ICI-free and therefore good candidates for unsynchronized signaling, whereas other subcarriers, such as 8, result in the generation of a significant amount of ICI.

FIG. 6 compares the spectrum of ICI products for two different subcarriers. According to FIG. 5, subcarrier #8 (upper circle) causes a large amount of ICI products as compared to subcarrier #16 (lower circle), and thus selecting subcarrier #16 for FSU signaling reduces the amount of ICI (sinc leakage) by more than 20 dB.

In a second exemplary embodiment of this invention the ICI is reduced or eliminated, e.g., there is a reduction of the leakage to the unsynchronized receiver, by the use of a phase shift.

Figure 3:
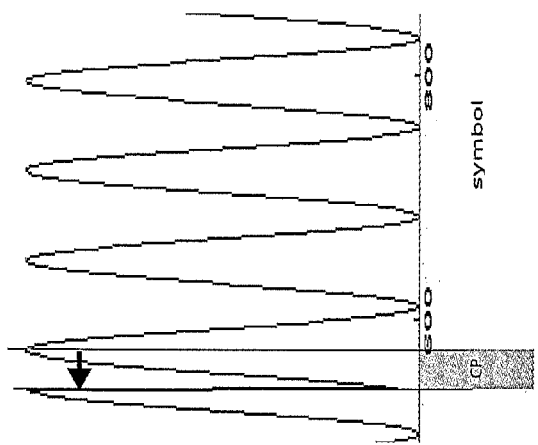
FIG. 3 shows phase shifting a subcarrier used for asynchronous signaling between two OFDM symbols.

In this embodiment the discontinuity between two symbols is removed by applying a phase shift on the subcarrier(s) used for unsynchronized signaling. As is shown in FIG. 3, the time domain waveform is shifted "backwards" relative to the previous symbol by one CP length in each consecutive symbol. In a typical OFDM transmitter, the phase shift can be implemented as a complex multiplication before the IFFT function (see also FIG. 4B).

As described above, the shift is considered incremental from the view of the previous symbol as a reference. However, this shift may also be seen as cumulative if the same symbol is chosen as a reference for all future observed symbols.

The resulting time domain waveform is a continuous sine wave. Ideally, so long as no modulation information is transmitted on the subcarrier for asynchronous signaling, this technique has the potential to totally prevent ICI to an unsynchronized receiver. When modulation is present one may trade off the data rate on the subcarrier with the amount of interference it creates to an unsynchronized receiver. Note that the data rate may be below one bit per OFDM symbol and asynchronous signaling subcarrier.

Once a receiver has acquired the symbol timing of the asynchronous transmission (e.g., the start of each block of n OFDM symbols, where weighted repetitions of the same value are transmitted on the asynchronous signaling subcarriers), it may apply the opposite phase rotation used during transmission, and is thereby enabled to reconstruct the transmitted value in amplitude and phase. The receiver may apply complex averaging, thereby realizing an improvement in SNR as compared to averaging based solely on magnitude.

In one embodiment, the radio system uses a number of ASCs, for example, every 12th subcarrier in a radio system using a subcarrier spacing of 15 kHz. The transmitter scales the power transmitted in each ASC by a common factor, so that the total power transmitted by all ASCs in a given frequency band follows a predetermined power envelope. The power envelope (similar to the above-mentioned sequence of weighting factors) is chosen to possess suitable autocorrelation properties that facilitate detection.

The receiver may perform power detection on all ASCs and determine the total power of all ASCs by summing up the individual powers. The receiver may then compare the time-varying sum against the predetermined power envelope, decide whether a transmitter is present, and recover its timing FIG. 4A reproduces FIG. 6.3.1 of technical specification 3 GPP TS 36.211 and provides an overview of the physical channel processing in a transmitter generating downlink signals conforming with E-UTRA requirements. For the generation of one OFDM symbol a resource element mapper 20 produces a complex sample vector 21 that is input to an OFDM signal generator 22. The OFDM signal generator 22 produces a baseband signal 23 that is upconverted to radio frequency and transmitted using an antenna over a radio link. Each element in vector 21 controls the amplitude and phase of one subcarrier in the transmitted signal.

Figure 4A:
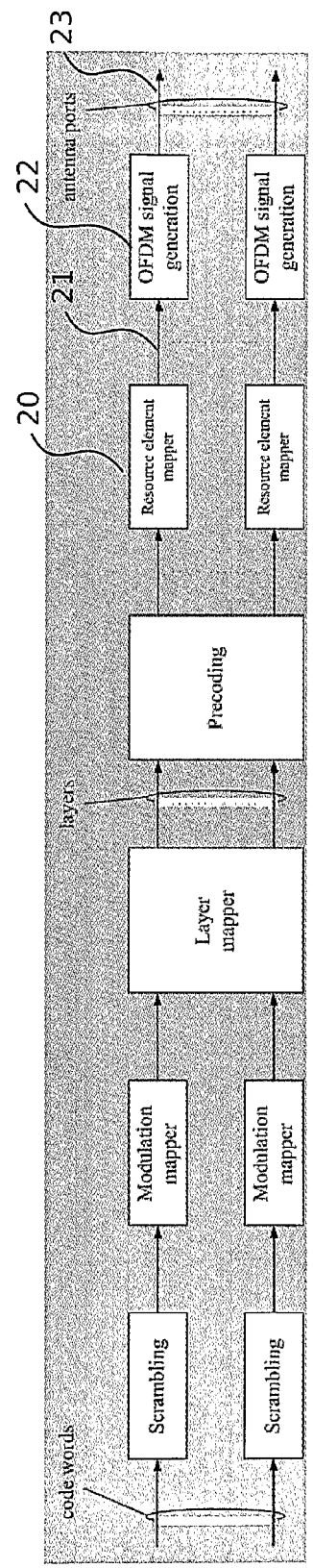

FIG. 4B shows an exemplary embodiment of the invention, forming at least part of the OFDM signal generation block 22 in FIG. 4A. A vector of complex samples 21 representing resource elements is input to an IFFT processor 30, each complex sample determining the amplitude and phase of one subcarrier of the IFFT output signal 31. Further, a vector of complex samples 41 representing subcarriers allocated for signaling with unsynchronized receivers is generated by an array of asynchronous subcarrier generators 32 and connected to inputs of IFFT 30 not connected to samples 21. Vector 41 may contain one or more elements. Each element in vector 41 is configured to control one subcarrier generated by the IFFT 30. Those subcarriers may be interspersed between subcarriers controlled by vector 21 and may therefore form a non-contiguous spectrum.

Each asynchronous subcarrier generator 32 processes one sample for asynchronous signaling 33 every m OFDM symbols. Interpolator 34 inserts m−1 zero samples for every sample 33, outputting a signal 35 with a rate of one sample per OFDM symbol. Signal 35 is subsequently processed by filter 36, applying the impulse response of the filter as a pulse shape resulting in the filtered signal 37. In one embodiment, filter 36 is a FIR filter with a length of m taps. In other words, inputting one sample 33 every m OFDM symbols results in a sequence of one sample per OFDM symbol at 37. A numerically controlled oscillator (NCO) 38 provides a signal 39 having constant amplitude and linearly time-varying phase to complex multiplier 40. As a non-limiting example, signal 39 is described by the equation:

$$s_{39}(i, k) = e^{-ijk 2\pi \frac{N_{CP}}{N_{symb}}},$$

where i is the number of the OFDM symbol, $j=\sqrt{-1}$, k is the number of the subcarrier controlled by the asynchronous subcarrier generator 32, $N_{symb}$ is the length of one OFDM symbol excluding the cyclic prefix, and $N_{CP}$ is the length of the cyclic prefix.

Figure 4C:
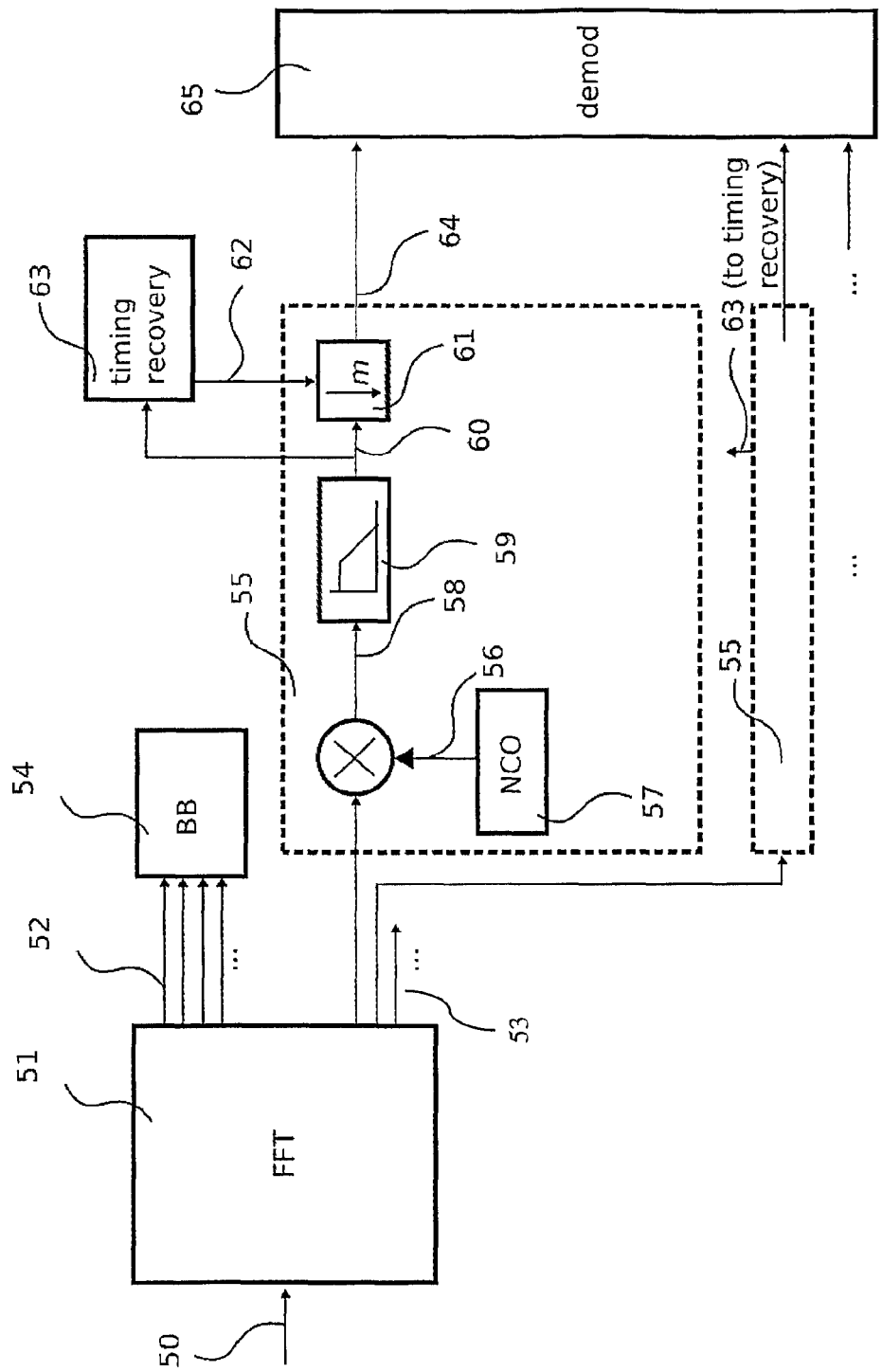

FIG. 4C shows part of an OFDM receiver implementing one embodiment of the invention. A vector of samples 50 of a received baseband signal having the length of one OFDM symbol (excluding the cyclic prefix) is input to an FFT block 51. The output of the FFT is a vector of complex samples 52 representing one subcarrier each. A vector 53 is formed using a predetermined list of subcarriers allocated for signaling with unsynchronized devices, and each such subcarrier sample is processed by one asynchronous subcarrier processor 55. The asynchronous subcarrier processor 55 multiplies the received complex sample with a rotating complex phasor 56 provided by an NCO 57. The resulting phase-rotated sample 58 is then provided as input to a filter 59. In one embodiment, the filter 59 is a FIR filter with a length of m−2 taps.

Decimator 61 discards a number of m−1 samples every in samples from the filtered sample stream 60. The decimation phase 62, that is, the index of the one-out-of-m samples that is kept, is common to all subcarrier processors 55 and is provided by a timing recovery block 63. In one embodiment, timing recovery block 63 is provided the filtered sample stream 60 from every individual subcarrier processor 55. In another embodiment, the timing recovery block 63 is instead provided the sum of squared magnitudes of all filtered sample streams 60. In yet another embodiment, the filter 59 is a polyphase FIR filter having several banks of filter coefficients, and the timing recovery block 63 controls filter 59 to select one bank of polyphase filter coefficients, effectively delaying the signal by a fraction of a sample length and providing the capability to resample the signal with sub-sample accuracy in decimator 61.

The decimated samples 64 arrive at a rate of one every m OFDM symbols and are provided to a processor block 65 that demodulates and decodes a message transmitted on the subcarriers allocated for asynchronous signaling. Other subcarrier samples 52 output from the FFT 51 are provided to baseband processing (BB) block 54, which is configured to perform conventional OFDM reception.

Note that the various units shown in FIGS. 4A, 4B and 4C may be constructed of circuitry, or they may be implemented by program code, such as code executed by a digital signal processor (DSP), or they may be implemented as a combination of circuitry and program code. The various units shown in FIGS. 4A, 4B and 4C may be implemented in whole or in part in one or more integrated circuit chips/modules.

In one aspect thereof various exemplary embodiments of this invention provide a mechanism to implement signaling for asynchronous devices using dedicated subcarriers such that intercarrier interference to adjacent subcarriers is minimized. The signaling takes place on dedicated subcarriers that may be set aside solely for use for asynchronous communications.

In another aspect thereof exemplary embodiments of this invention provide a mechanism to implement signaling for asynchronous devices using a predetermined phase shift that is added to a transmitted signal to reduce or eliminate the discontinuity between two symbols.

Exemplary embodiments of this invention may be used to implement signaling tones in an OFDM system, where the transmitter and receiver are not synchronized to one another.

In contradistinction to the proposal of V. Venkateswaran et al., exemplary embodiments of this invention enable communication between unsynchronized devices in order to minimize interference by FSU system design.

In one aspect thereof these exemplary embodiments provide a radio system, apparatus and methods that use frequency domain processing, where selected subcarriers are allocated for unsynchronized communications. In this system, apparatus and methods the selected subcarriers are used for FSU-related signaling.

In one exemplary embodiment of this system, the subcarriers for unsynchronized communications are selected based on the amount of interference they generate, and the data rate of the unsynchronized signaling is made to be a fraction of the synchronized symbol rate such that a FSU signaling symbol extends over the length of several data symbols. The transmitter repeats each unsynchronized symbol over the length of several OFDM symbols, weighted with predetermined amplitudes.

In another exemplary embodiment of the system, apparatus and methods, a sine wave in the time domain is generated from a complex value in the frequency domain by means of IFFT. For those selected subcarriers that are allocated for asynchronous signaling the phase is rotated with each OFDM symbol by an amount that corresponds to the phase angle that the time domain waveform passes through within one CP length. As a consequence, the transmitted time domain signal of selected subcarriers is made continuous between OFDM symbols, assuming that the frequency domain value (before phase rotation) remains substantially constant.

In the foregoing, the selected subcarriers may be used as "busy tones".

Various exemplary embodiments of this invention provide a radio system with frequency domain processing, where subcarriers are allocated for signaling with unsynchronized receivers using low bit rate signals, each with a data rate of less than one bit per OFDM symbol, each to be modulated on one predetermined subcarrier, and where the transmitter calculates and applies a progressive phase rotation to each sample of the signal, corresponding to the ratio between the cycle length of said subcarrier to the CP length and converts the phase rotated sample to a time domain waveform by inserting it into an IFFT.

These exemplary embodiments also encompass a receiver that uses power detection and correlation with the power pattern to detect the presence of a transmitter to recover the timing. The receiver employs averaging over the power of all asynchronous signaling subcarriers that are known to be used at the same time by the transmitter, and applies the inverse phase rotation of the transmitter in combination with complex averaging to subsequent values from each individual asynchronous signaling subcarrier. The receiver demodulates the data payload per asynchronous signaling subcarrier and uses the data payload at least for resource negotiation with the transmitter.

These exemplary embodiments thus provide means for signaling between unsynchronized OHM transceivers using selected subcarriers, that are generated according to a process wherein the sine wave in the time domain is generated from the complex value in the frequency domain by means of IFFT, and rotating the phase on the selected subcarriers of each OFDM symbol by an amount that corresponds to the phase angle that the time domain waveform passes through within one CP length.

As was noted, the various blocks shown in FIG. 4 may be viewed as method steps, and/or as operations that result from operation of computer program code, and/or as a plurality of coupled logic circuit elements constructed to carry out the associated function(s).

Based on the foregoing it should be apparent that exemplary embodiments of this invention provide a method, apparatus and computer program(s) to provided signaling for asynchronous devices.

Figure 10:
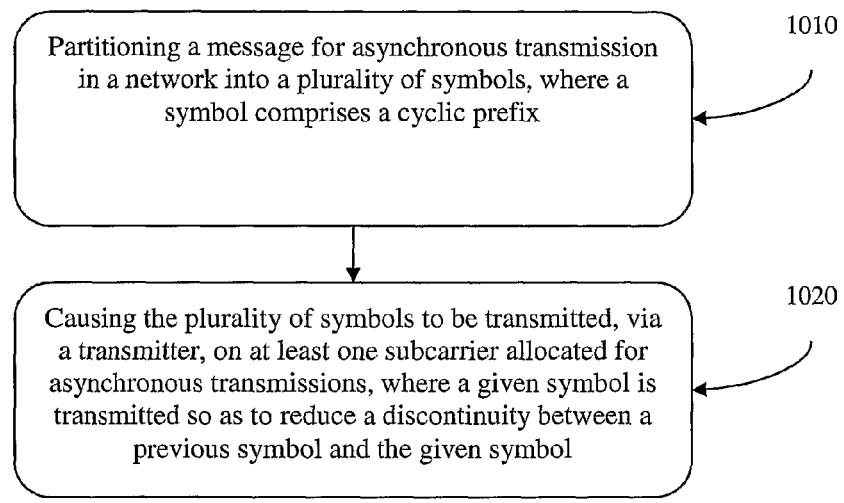
FIG. 10 is a logic flow diagram that illustrates the operation of an exemplary method, and a result of execution of computer program instructions embodied on a computer readable memory, in accordance with exemplary embodiments of this invention.

FIG. 10 is a logic flow diagram that illustrates the operation of a method, and a result of execution of computer program instructions, in accordance with exemplary embodiments of this invention. In accordance with these exemplary embodiments a method performs, at Block 1010, a step of partitioning a message for asynchronous transmission in a network into a plurality of symbols, where a symbol comprises a cyclic prefix. Causing the plurality of symbols to be transmitted (e.g., via a transmitter) on at least one subcarrier allocated for asynchronous transmissions, where a given symbol is transmitted so as to reduce a discontinuity between a previous symbol and the given symbol is performed at Block 1020.

The various blocks shown in FIG. 10 may be viewed as method steps, and/or as operations that result from operation of computer program code, and/or as a plurality of coupled logic circuit elements constructed to carry out the associated function(s).

An exemplary embodiment in accordance with this invention is a method for unsynchronized signaling between nodes in a network. The method includes partitioning a message for asynchronous transmission in a network into a plurality of symbols. A symbol includes a cyclic prefix. Causing the plurality of symbols to be transmitted (for example, via a transmitter) on one or more subcarriers allocated for asynchronous transmissions is also included in the method. A given symbol is transmitted so as to reduce a discontinuity between a previous symbol and the given symbol.

In a further exemplary embodiment of the method above, the method also includes applying a phase shift to at least one symbol of the plurality of symbols.

In an additional exemplary embodiment of any one of the methods above, transmitting includes transmitting at a transmission frequency. A length of a transmission cycle is determined by the transmission frequency and a length of the cyclic prefix is equal to an integer number of transmission cycles.

In a further exemplary embodiment of any one of the methods above, the network is configured for FSU signaling. An FSU signaling symbol may be transmitted using at least two symbols.

In an additional exemplary embodiment of any one of the methods above, the network is configured for FDD.

In a further exemplary embodiment of any one of the methods above, the plurality of symbols include a sub-set including at least two symbols where a first symbol is repeated in each symbol of the sub-set. The method may also include scaling each symbol of the sub-set with a sequence of weighting factors.

An additional exemplary embodiment in accordance with this invention is an apparatus for unsynchronized signaling between nodes in a network. The apparatus includes one or more processors; and one or more memories including computer program code. The one or more memories and the computer program code configured to, with the one or more processors, at least cause the apparatus: to partition a message for asynchronous transmission in a network into a plurality of symbols, where a symbol comprises a cyclic prefix; and to cause the plurality of symbols to be transmitted, via a transmitter, on at least one subcarrier allocated for asynchronous transmissions, where a given symbol is transmitted so as to reduce a discontinuity between a previous symbol and the given symbol.

In a further exemplary embodiment of the apparatus above, the one or more memories and the computer program code configured to, with the one or more processors, also cause the apparatus: to apply phase shift to at least one symbol of the plurality of symbols.

In an additional exemplary embodiment of any one of the apparatus above, transmitting includes transmitting at a transmission frequency. A length of a transmission cycle is determined by the transmission frequency and a length of the cyclic prefix is equal to an integer number of transmission cycles.

In a further exemplary embodiment of any one of the apparatus above, the network is configured for FSU signaling. An FSU signaling symbol may be transmitted using at least two symbols.

In an additional exemplary embodiment of any one of the apparatus above, the network is configured for FDD.

In a further exemplary embodiment of any one of the apparatus above, the plurality of symbols include a sub-set including at least two symbols where a first symbol is repeated in each symbol of the sub-set. The one or more memories and the computer program code configured to, with the one or more processors, also cause the apparatus: to scale each symbol of the sub-set with a sequence of weighting factors.

In an additional exemplary embodiment of any one of the apparatus above, the apparatus also includes a transmitter configured to transmit on at least one subcarrier.

A further exemplary embodiment in accordance with this invention is a computer readable medium for unsynchronized signaling between nodes in a network. The computer readable medium is tangibly encoded with a computer program executable by a processor to perform actions. The actions include partitioning a message for asynchronous transmission in a network into a plurality of symbols. A symbol includes a cyclic prefix. Causing the plurality of symbols to be transmitted (for example, via a transmitter) on one or more subcarriers allocated for asynchronous transmissions is also included in the actions. A given symbol is transmitted so as to reduce a discontinuity between a previous symbol and the given symbol.

In an additional exemplary embodiment of the computer readable medium above, the actions also include applying a phase shift to at least one symbol of the plurality of symbols.

In a further exemplary embodiment of any one of the computer readable media above, transmitting includes transmitting at a transmission frequency. A length of a transmission cycle is determined by the transmission frequency and a length of the cyclic prefix is equal to an integer number of transmission cycles.

In an additional exemplary embodiment of any one of the computer readable media above, the network is configured for FSU signaling. An FSU signaling symbol may be transmitted using at least two symbols.

In a further exemplary embodiment of any one of the computer readable media above, the network is configured for FDD.

In an additional exemplary embodiment of any one of the computer readable media above, the plurality of symbols include a sub-set including at least two symbols where a first symbol is repeated in each symbol of the sub-set. The actions may also include scaling each symbol of the sub-set with a sequence of weighting factors.

A further exemplary embodiment in accordance with this invention is an apparatus for unsynchronized signaling between nodes in a network. The apparatus includes means for partitioning a message for asynchronous transmission in a network into a plurality of symbols. A symbol includes a cyclic prefix. Means for transmitting the plurality of symbols on one or more subcarriers allocated for asynchronous transmissions is also included in the apparatus. A given symbol is transmitted so as to reduce a discontinuity between a previous symbol and the given symbol.

In an additional exemplary embodiment of the apparatus above, the apparatus also includes means for applying a phase shift to at least one symbol of the plurality of symbols.

In a further exemplary embodiment of any one of the apparatus above, transmitting includes transmitting at a transmission frequency. A length of a transmission cycle is determined by the transmission frequency and a length of the cyclic prefix is equal to an integer number of transmission cycles.

In an additional exemplary embodiment of any one of the apparatus above, the network is configured for FSU signaling. An FSU signaling symbol may be transmitted using at least two symbols.

In a further exemplary embodiment of any one of the apparatus above, the network is configured for FDD.

In an additional exemplary embodiment of any one of the apparatus above, the plurality of symbols include a sub-set including at least two symbols where a first symbol is repeated in each symbol of the sub-set. The apparatus may also include means for scaling each symbol of the sub-set with a sequence of weighting factors.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design can be fabricated as one or more integrated circuit devices.

It should thus be appreciated that exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while various exemplary embodiments have been described above in the context of the FSU-type system (e.g., an IMT-A system), it should be appreciated that exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
partitioning a message for asynchronous transmission in a network into a plurality of symbols, wherein the plurality of symbols comprise a sub-set comprising at least two symbols where a first symbol is repeated in each symbol of the sub-set and
wherein a symbol comprises a cyclic prefix; and
causing the plurality of symbols to be transmitted, via a transmitter, on at least one subcarrier allocated for asynchronous transmissions, wherein a given symbol is transmitted so as to reduce a discontinuity between a previous symbol and the given symbol, wherein transmitting comprises transmitting at a transmission frequency, where a length of a transmission cycle is determined by the transmission frequency, and where a length of the cyclic prefix is equal to an integer number of transmission cycles.

2. The method of claim 1, further comprising applying a phase shift to at least one symbol of the plurality of symbols.

3. The method of claim 1, wherein the network is configured for flexible spectrum use signaling.

4. The method of claim 3, wherein a flexible spectrum use signaling symbol is transmitted using at least two symbols.

5. The method of claim 1, wherein the network is configured for frequency division duplexing.

6. The method of claim 1, further comprising scaling each symbol of the sub-set with a sequence of weighting factors.

7. An apparatus, comprising: at least one processor; and at least one memory including computer program code, the at least one memory and the computer program code configured to, with the at least one processor, cause the apparatus to perform at least the following:

to partition a message for asynchronous transmission in a network into a plurality of symbols, wherein the plurality of symbols comprise a sub-set comprising at least two symbols where a first symbol is repeated in each symbol of the sub-set, and wherein the at least one memory and the computer program code configured to, with the at least one processor, further cause the apparatus to perform: to scale each symbol of the sub-set with a sequence of weighting factors, and wherein a symbol comprises a cyclic prefix; and to cause the plurality of symbols to be transmitted, via a transmitter, on at least one subcarrier allocated for asynchronous transmissions, wherein a given symbol is transmitted so as to reduce a discontinuity between a previous symbol and the given symbol, wherein causing the plurality of symbols to be transmitted comprises causing the plurality of symbols to be transmitted at a transmission frequency, wherein a length of a transmission cycle is determined by the transmission frequency, and wherein a length of the cyclic prefix is equal to an integer number of transmission cycles.

8. The apparatus of claim 7, wherein the at least one memory and the computer program code configured to, with the at least one processor, further cause the apparatus to perform: to apply a phase shift to at least one symbol of the plurality of symbols.

9. A non-transitory computer readable medium tangibly encoded with a computer program executable by a processor to perform actions comprising:

partitioning a message for asynchronous transmission in a network into a plurality of symbols, wherein the plurality of symbols comprise a sub-set comprising at least two symbols where a first symbol is repeated in each symbol of the sub-set and the operations further comprise scaling each symbol of the sub-set with a sequence of weighting factors and where a symbol comprises a cyclic prefix; and causing the plurality of symbols to be transmitted, via a transmitter, on at least one subcarrier allocated for asynchronous transmissions, where a given symbol is transmitted so as to reduce a discontinuity between a previous symbol and the given symbol, wherein transmitting comprises transmitting at a transmission frequency, wherein a length of a transmission cycle is determined by the transmission frequency, and wherein a length of the cyclic prefix is equal to an integer number of transmission cycles.

10. The non-transitory computer readable medium of claim 9, further comprising applying a phase shift to at least one symbol of the plurality of symbols.

11. The non-transitory computer readable medium of claim 9, wherein the network is configured for flexible spectrum use signaling.

12. An apparatus, comprising:

means for partitioning a message for asynchronous transmission in a network into a plurality of symbols, wherein the plurality of symbols comprise the sub-set comprising at least two symbols where a first symbol is repeated in each symbol of the sub-set and the apparatus further comprising means for scaling each symbol of the sub-set with a sequence of weighting factors and wherein a symbol comprises a cyclic prefix; and means for causing the plurality of symbols to be transmitted on at least one subcarrier allocated for asynchronous transmissions, wherein a given symbol is transmitted so as to reduce a discontinuity between a previous symbol and the given symbol, wherein means for causing the plurality of symbols to be transmitted comprises causing the plurality of symbols to be transmitted at a transmission frequency, wherein a length of a transmission cycle is determined by the transmission frequency, and wherein a length of the cyclic prefix is equal to an integer number of transmission cycles.

13. The apparatus of claim 12, further comprising means for applying a phase shift to at least one symbol of the plurality of symbols.

\* \* \* \* \*